United States Patent
Tohara et al.

(10) Patent No.: US 7,963,872 B2
(45) Date of Patent: Jun. 21, 2011

(54) TRANSMISSION CHAIN FOR USE IN ENGINE

(75) Inventors: Takashi Tohara, Osaka (JP); Tatsuya Konishi, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 504 days.

(21) Appl. No.: 12/125,451

(22) Filed: May 22, 2008

(65) Prior Publication Data

US 2009/0017951 A1    Jan. 15, 2009

(30) Foreign Application Priority Data

Jul. 13, 2007  (JP) ................... 2007-184864

(51) Int. Cl.
*F16G 13/04* (2006.01)
(52) U.S. Cl. .................... 474/212; 474/157; 474/206
(58) Field of Classification Search ............. 474/157, 474/155, 156, 206, 111, 140, 212, 202, 213
See application file for complete search history.

(56) References Cited

U.S. PATENT DOCUMENTS

| | | | | |
|---|---|---|---|---|
| 2,798,381 A | * | 7/1957 | Siverson | 474/222 |
| 4,099,424 A | * | 7/1978 | Pemberton | 474/156 |
| 4,328,665 A | * | 5/1982 | Taubert et al. | 59/88 |
| 4,411,131 A | | 10/1983 | Ohnishi et al. | |
| 6,155,945 A | * | 12/2000 | Matsuda | 474/212 |
| 6,220,981 B1 | | 4/2001 | Yoshida | |
| 2002/0049107 A1 | * | 4/2002 | Ledvina | 474/213 |
| 2005/0202914 A1 | * | 9/2005 | Reiter et al. | 474/206 |
| 2006/0079363 A1 | | 4/2006 | Miyazawa | |

FOREIGN PATENT DOCUMENTS

| | | |
|---|---|---|
| JP | 56-134651 | 10/1981 |
| JP | 11-236949 | 8/1999 |
| JP | 2006-105325 | 4/2006 |

* cited by examiner

*Primary Examiner* — Emmanuel M Marcelo
(74) *Attorney, Agent, or Firm* — Howson & Howson LLP

(57) ABSTRACT

The plates of transmission chain for an engine are formed with a guide-contacting configuration composed of spaced flat surfaces that come into sliding contact with a flat chain guide, and convex surfaces, continuous with and between the flat surfaces, for sliding contact with a convex chain guide. The convex surfaces are connected by a concave surface that, with the guide surface, forms an oil-retaining clearance. The radius of curvature of the convex curved surfaces of the plate preferably increases gradually from the location where they meet the flat surfaces toward the location where they meet the concave surface. The plates can have the same configuration on the side facing the inside of chain loop as on the side facing the outside of the chain loop.

2 Claims, 10 Drawing Sheets

TRANSMISSION CHAIN FOR USE IN ENGINE

CROSS-REFERENCE TO RELATED APPLICATION

This application claims priority on the basis of Japanese patent application 2007-184864, filed Jul. 13, 2007. The disclosure of Japanese application 2007-184864 is incorporated by reference.

FIELD OF THE INVENTION

The invention relates to a transmission chain for use in an engine such as an automobile engine, and more specifically to a chain for use as a timing chain for transmitting power to a camshaft, or an auxiliary mechanism such as an oil pump or the like, or as a balancer chain.

BACKGROUND OF THE INVENTION

Most automobile engines include a chain transmission which transmits power through an endless chain engaged with a driving sprocket and a driven sprocket. In a typical transmission chain, as exemplified by chain 500 in FIG. 10, concave chain surfaces 511 and 551, that come into facing relationship with a chain guide, are formed respectively on the guide facing sides of inner link plates 510 and outer link plate 550. Lubricating oil is retained by these guide-facing concave surfaces 511 and 551 to reduce friction between the chain and the chain guides, which can include both an arc-shaped chain guide G1 and a straight chain guide G2. An example of such a chain transmission, including an arc-shaped chain guide and a straight chain guide, is described in United States Patent Publication 2006/0079363, published Apr. 16, 2006.

As seen in FIG. 10, the length of each such concave guide-facing surface 511 and 551, in the direction of the length of the chain, is at least as great as the chain pitch P, i.e., the distance between the centers of the pin holes 512 formed in the inner link plates 510, and between the centers of the pin holes 552 formed in the outer link plate 550.

As shown in FIG. 10, in the conventional transmission chain 500, because the lengths of the guide-facing concave surfaces 511 and 551 are respectively equal to or greater than the chain pitch P, tensile stress is concentrated at parts F of plate portions E, which are aligned with the centers of holes 512 of the inner link plates, in which bushings are press-fit, and with the centers of holes 552 of the outer link plates, in which connecting pins are press-fit. The plate portions E have a cutout shape, and stress, due to sliding contact between the chain and an arc-shaped chain guide G1 or a straight chain guide G2, acts on these plate portions E, causing fatigue fracture and chain breakage.

There has been a need for improvements in the strength of the plate portions E.

As shown in FIG. 10, since an inner link plate 510, or the outer link plate 550, comes into contact with a linear chain guide G2 at small contact regions Z, it is not possible to retain sufficient lubricating oil, and sliding resistance is generated in both regions Z, so that there is a possibility of failure of the link plates.

Since the guide-facing surfaces 511 and 551, formed on peripheral portions of the link plates are concave, an arc-shaped chain guide G1 can enter the concave guide-facing surfaces 511 and 551. The result is that the chain sinks toward the arc-shaped guide G1, causing slack to be generated in the chain and a possibility for the chain path to become unstable.

Accordingly, an object of the invention is to solve the above-described problems, and to provide a transmission chain in which sinking of a chain with respect to a convex surface of a chain guide is reduced so that the chain path is stabilized, in which the link plates have improved strength in the regains where tensile force is concentrated, and fatigue failure is liable to generate is improved, and lubricating oil is reliably retained between the chain guide and the plate so that improved endurance is achieved.

SUMMARY OF THE INVENTION

The traveling transmission chain in accordance with the invention can be any one of a variety of kinds of transmission chain, including a roller chain, a rollerless bushing chain. Advantages of invention can also be realized in a silent chain. Each such chain comprises first and second sets of plates interconnected in overlapping relationship and forming an elongated, endless loop. Each plate has a pair of holes for receiving a connecting pin, and the chain has a chain pitch equal to the distance from the center of one of the holes in each of its plate to the center of the other hole in the same plate. The chain pitch is also the distance between the centers of successive connecting pins, which are press-fit into the outside plates of the chain. Each plate of both sets has a guide-engaging portion for sliding contact with a chain guide.

The guide-engaging portion of each plate of at least one of the first and second sets comprises a pair of front and rear flat surfaces, spaced from each other in the direction of elongation of the chain, for sliding contact with a flat guide surface of a chain guide. The guide-engaging portion of each plate of said at least one of the first and second sets also comprises a pair of front and rear convex, curved, surfaces for sliding contact with a convex guide surface a chain guide. Each said convex curved surface of each plate is continuous with one of the flat surface at a boundary. The convex curved surfaces of each plate is disposed between the flat surfaces of the same plate in the direction of elongation of the chain. Each plate of said at least one of the first and second sets also has a concave surface, extending from one of the convex curved surfaces of the same plate to the other convex curved surface of the same plate, for forming a lubricating oil-retaining clearance between the plate and a flat guide surface and for also forming a lubricating oil-retaining clearance between the plate and a convex guide surface. The distance between the boundaries between the flat and convex surfaces of each plate of said at least one of the first and second sets is shorter than the chain pitch.

Preferably, the radius of curvature of each convex curved surface gradually increases in the direction from the boundary at which it meets a flat surface toward the concave surface of the same plate.

At least in the case of a roller or bushing chain, each plate can be symmetrical about a plane extending in the longitudinal direction of the chain and perpendicular to the faces of the plate. That is, each plate can have substantially identical edge configurations facing the inside of the loop and facing the outside of the loop.

The plate edge configuration produces a capillary action which induces flow of lubricating oil into the lubricating oil-retaining clearance, thereby ensuring formation of a stable oil film, and reduced friction between the chain and a chain guide.

When the plate flat surfaces come into sliding contact with a flat guide surface of a chain guide lubricating oil retained in the lubricating oil-retaining clearance is reliably sealed, and outward leakage of the lubricating oil is suppressed, so that smooth sliding contact with the chain guide can be maintained. Furthermore, when the transmission has both flat and convex chain guides, since the flat surfaces of the plates come into sliding contact with a flat guide surface and the convex curved surfaces of the plates come into sliding contact with a convex guide surface of the chain guide, concentration of stress from both chain guides at specific positions on the plates is avoided, and the endurance of the chain is significantly improved.

In a plate of a chain, tensile stress is liable to be concentrated, and fatigue fracture is most likely to occur, at a location on a line intersecting the center of a hole in which a pin or bushing is press-fit and extending to the guide-engaging surface of plate in a direction perpendicular to the direction of elongation of the chain. Because the distance between the boundaries where the flat and convex surfaces of each plate meet is shorter than the chain pitch, the convex curved surface is not formed at the location where stress is liable to be concentrated, and fatigue fracture is most likely to occur. Consequently, reduction in plate strength can be avoided. Stress due to sliding contact with a flat guide surface can act at the location of the above-described line without a significant adverse effect on chain strength, since stress is distributed over two mutually engaging flat surfaces rather than concentrated in a very narrow area.

Because the distance between the positions at which a plate according to the invention contacts a convex guide surface is less than the corresponding distance in a conventional plate, where the distance is equal to or greater than the chain pitch, sinking of the chain with respect to the convex guide surface is reduced, and chain slack due to sinking of the chain is avoided, so that the chain path is stabilized.

When the radius curvature of the convex curved surfaces of the plate increases gradually in the direction from the flat surface toward concave surface, excessive widening of the lubricating oil-retaining clearance is avoided, and the capillary action which induces lubricating oil into the lubricating oil-retaining clearance is enhanced. Thus, smoother sliding contact of the plate with a chain guide can be achieved.

When each plate has substantially identical edge configurations facing the inside of the loop and facing the outside of the loop, the shapes of the plates can be symmetrical about a plane extending along the direction of the length of the chain, and it becomes unnecessary to consider the orientation of the plates when assembling the chain. Thus, the chain assembly operation becomes easier. Moreover, a weight reduction of the plates and an overall reduction in the weight of the chain can be realized.

DETAILED DESCRIPTION OF THE PREFERRED EMBODIMENT

When the guide-engaging portion of each plate comprises spaced front and rear flat surfaces and front and rear convex curved surfaces, each continuous with one of the flat surfaces, the convex curved surfaces are disposed between the flat surfaces, and a concave surface extends from one of the convex curved surfaces to the other for forming a lubricating oil-retaining clearance, and the distance between the boundaries between the flat and convex surfaces of each plate is shorter than the chain pitch, sinking of the chain toward a convex guide surface of the chain guide is reduced, and the chain path is stabilized. At the same time, the strength of the portions of the plates where stress is liable to be concentrated and fatigue failure is likely to occur is improved, and lubricating oil is more reliably retained between the chain guide and the plate so that superior endurance can be realized.

The invention can be embodied in various kinds of transmission chains, including chains in which guide-engaging surfaces are formed both on the outwardly facing side of the chain loop and on the inwardly facing side, and chains in which the guide-engaging surfaces are formed only on one side, e.g., the outwardly facing side. When the plates have guide-engaging portions formed on both sides, the shapes of the plates can be symmetrical about a plane extending in the direction of the length of the chain and perpendicular to the faces of the plates. In that case, the orientation of the plates does not need to be taken into account during assembly of the chain, and the overall weight of the chain can be reduced.

The transmission chain in accordance with the invention can be a roller chain, a rollerless bushing chain, a silent chain, or the like. In the case of a roller chain or bushing chain, engagement with a sprocket can be made smoother, and excessive wear of the chain can be prevented. In the case of a silent chain, engagement noise, generated when the chain engages with a sprocket, can be reduced.

In the case of a roller chain or bushing chain having plates that do not come into sliding contact with a guide, only the plates that come into sliding contact with a guide need to have the guide-contacting surface configuration described above. Likewise, in the case of a silent chain where only some, but not all, of the plates come into contact with a chain guide, only the plates that come into sliding contact with chain guide need to have the above-described guide-contacting surface configuration.

Figure 1:
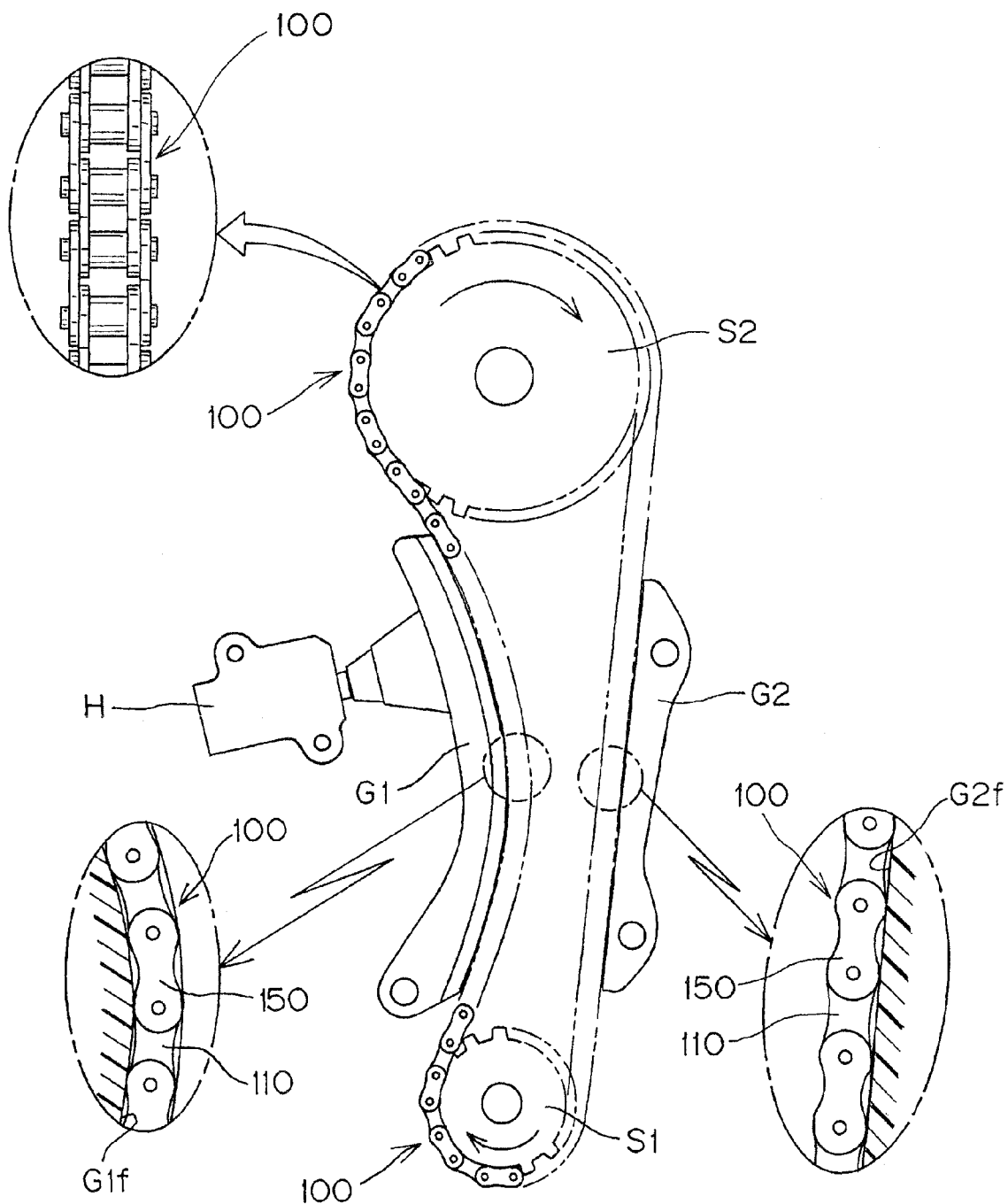
FIG. 1 is a schematic elevational view of the timing transmission of an engine, incorporating a transmission chain in accordance with the invention, including several enlarged auxiliary views illustrating details.

As shown in FIG. 1, a transmission chain 100 according to a first embodiment of the invention is a timing chain for an automobile engine. The chain is in mesh with a driving sprocket S1 on an engine crankshaft, and with a driven sprocket S2 on a valve-operating camshaft, and transmits the rotation of the driving sprocket S1 to the driven sprocket S2.

A chain guide G1, is pivotally supported on an engine body. Its back surface is pressed by a tensioner H at a location remote from the pivot axis in order to apply appropriate tension to the portion of transmission chain traveling from the driving sprocket S1 toward the driven sprocket S2. This chain guide G1 has a convex guide surface G1*f*, which comes into sliding contact with the outwardly facing side of the transmission chain 100. A second chain guide G2 is a fixed guide, attached to the engine body, and slidably engaged with a portion of the chain traveling from the driven sprocket S2 toward the driving sprocket S1. This chain guide G2 has a flat guide surface G2*f*, which comes into sliding contact with the outwardly facing side of the chain.

Figure 2:
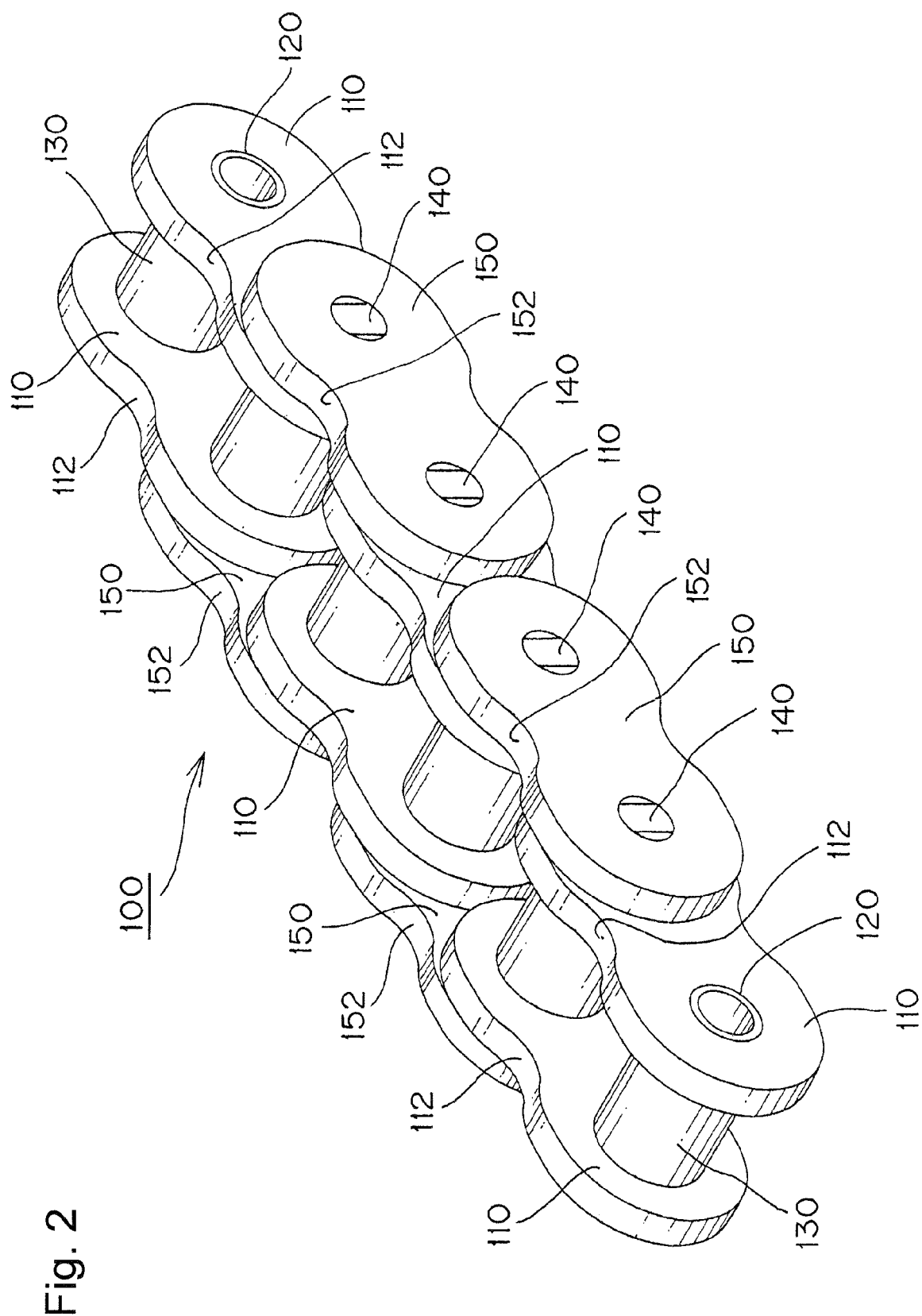
FIG. 2 is a perspective view of a part of the transmission chain of FIG. 1.

As shown in FIG. 2, the transmission chain 100 comprises pairs of laterally spaced inner plates 110, and pairs of bushings 120, press-fit into holes 111 (FIG. 3) in the inner plates 110, so that the laterally spaced pairs of inner plates 110 are connected to each other by front and rear bushings. Pairs of outer plates 150 are connected in laterally spaced relationship by connecting pins 140, which are press-fit into pin holes 151 in the outer plates, so that the laterally spaced outer plates are connected to each other by front and rear connecting pins. The pin holes 151 are smaller than the bushing holes 111, but shown in the same size for convenience in FIG. 3.

One of the pins connecting a first pair of outer plates extends rotatably through one of the bushings in a pair of inner plates. One of the pins connecting a second pair of outer plates extends rotatably through the other bushing in the same pair of inner plates. In this way, each pair of inner plates is overlapped by, and connected articulably to, two pairs of outer plates.

Figure 4:
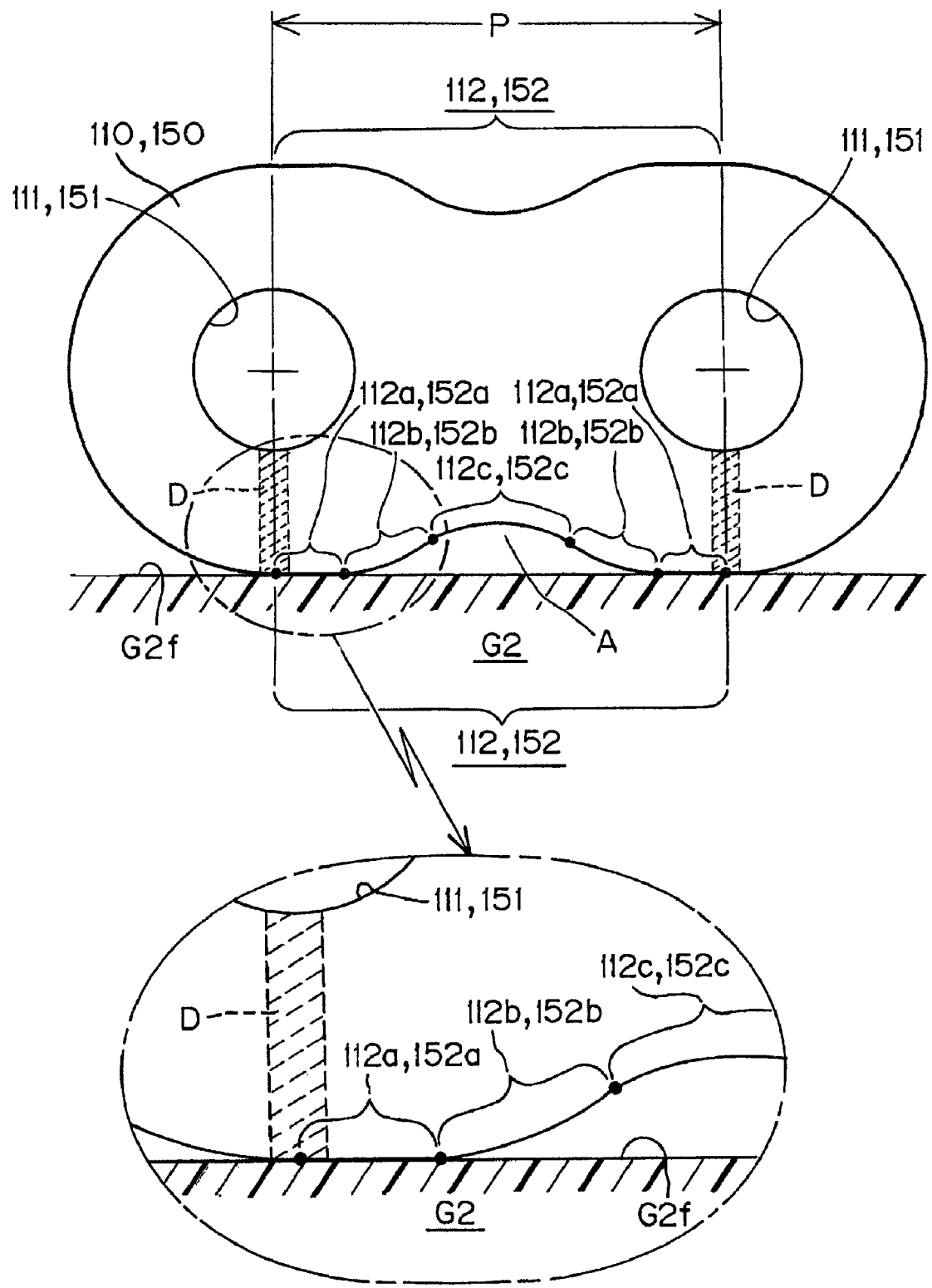
FIG. 4 is a side elevational view, illustrating sliding contact between the chain and a flat chain guide surface, including an enlarged auxiliary view.

As shown in FIG. 4, the inner and outer plates 110 and 150 include sliding contact portions 112 and 152 respectively, which come into sliding contact with chain guides G1 and G2 on the outwardly facing side of the chain loop.

Each of the sliding contact portions 112 and 152 comprises a pair of front and rear flat surfaces 112*a* and 152*a* respectively. The flat surfaces are formed on front and rear parts of each inner plate 110 and on front and rear parts of each outer plate 150. Front and rear convex curved surfaces 112*b* and 152*b* are respectively continuous with the flat surfaces 112*a* and 152*a* and extend to intermediate lubricating oil retaining concave surfaces 112*c* and 152*c*.

As shown in FIG. 4, as a plate comes into sliding contact with a chain guide G2 having a flat guide surface G2*f*, the flat surfaces of the plate are in surface contact with the flat surface of the chain guide over areas having a length corresponding to the length of each flat surface of the plate.

Figure 5:
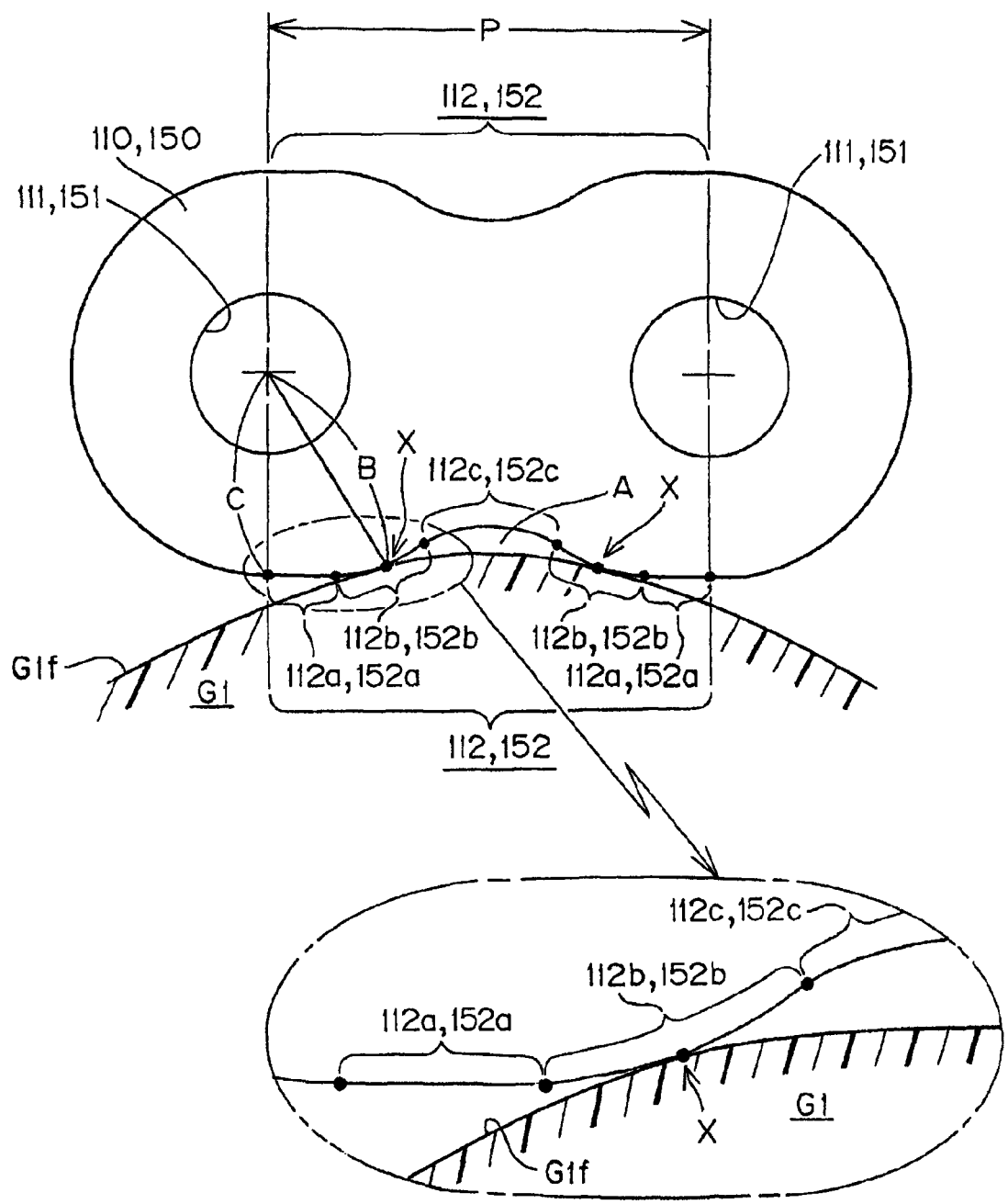
FIG. 5 is a side elevational view, illustrating sliding contact between the chain and a convex chain guide surface including an enlarged auxiliary view.

The convex curved surfaces 112*b* and 152*b* are continuous with the flat surfaces 112*a* and 152*a* respectively, and extend toward the centrally located concave surfaces 112*c* and 152*c*. As shown in FIG. 5, when the plate is in sliding contact with a convex chain guide G1, the chain guide G1 comes into sliding contact with the convex curved surfaces 112*b* and 152*b* at contact locations X.

The radii of curvature of convex curved surfaces 112*b* and 152*b* gradually increase from the boundaries at which they meet the flat surfaces 112*a* and 152*a* toward the centrally located, lubricating oil-retaining, concave surfaces 112*c* and 152*c*. Because of the gradual increase in the radius of curvature, excessive widening of the lubricating oil-retaining clearance A, between the chain guides G1 and G2 and the concave surfaces 112*c* and 152*c* is avoided. Therefore, capillary action, which induces flow of lubricating oil into the oil retaining clearance A, is ensured.

Figure 3:
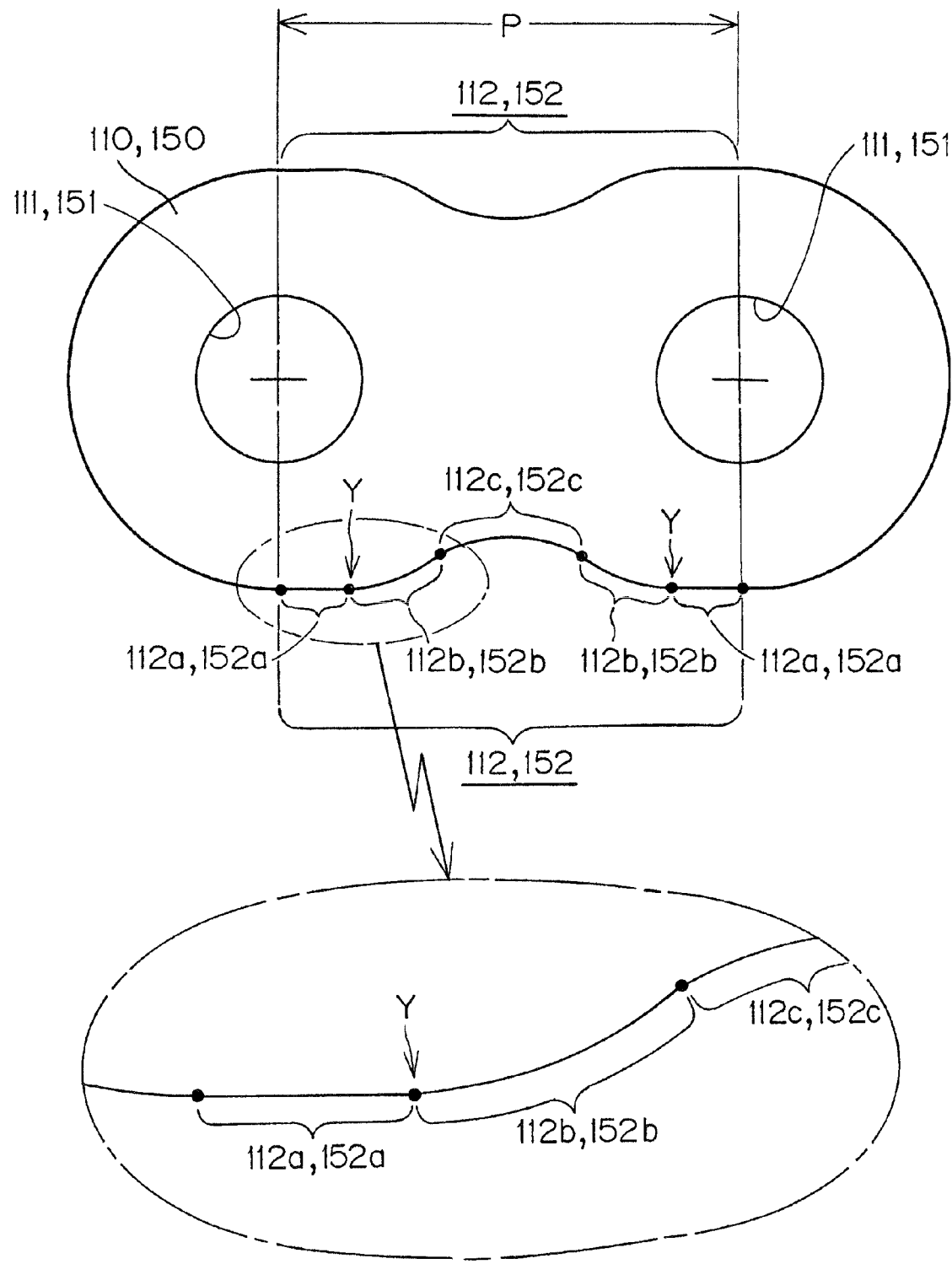
FIG. 3 is a side elevation of view of an inner or outer plate of the transmission chain, including an enlarged auxiliary view.

As shown in FIG. 3, the distance between boundaries Y between the convex curved surfaces 112*b* and 152*b* and the flat surfaces 112*a* and 152*a* is shorter than the chain pitch P. Furthermore, as shown in FIG. 5, the distance B from the center of the bushing holes 111, or the pin holes 151, to the contact positions X at which the convex guide surface G1*f* contacts convex curved surfaces 112*b* and 152*b* is greater than the minimum distance C from the center of the bushing holes 111 or the pin holes 151 to the flat surfaces 112*a* and 152*a*. Thus, enhanced chain strength can be achieved even when stress acts on the convex portion of the plate near the contact position X.

The lubricating oil-retaining concave surfaces 112*c* and 152*c* respectively span the front and rear convex curved surfaces 112*b* and 152*b*, as shown in FIGS. 3 to 5. Lubricating oil is retained in a lubricating oil retaining clearance A between the concave surfaces 112*c* and 152*c* and the chain guides G1 and G2.

The height of the lubricating oil-retaining clearance A, that is, the maximum distance between the lubricating retaining concave curves 112*c* and 152*c* and the chain guides G1 and G2, is preferably 1 mm or less, so that sufficient capillary action, by which flow of lubricating oil into oil-retaining clearance A is induced, can be exhibited.

The inner plates 110 and the outer plates 150 preferably include portions 112 and 152 on the inwardly facing side of the chain loop, as shown in FIGS. 3 to 5. The plates are symmetrical about a plane extending in the direction of elongation of chain and in a direction perpendicular to the faces of the plates. Since the plates 110 and 150 have a symmetrical shape, assembly of the chain can be carried out without considering orientation of the plates.

The capillary phenomenon, which induces flow of lubricating oil into the oil-retaining clearance A between this sliding contact portions 112 and 152 and a flat guide surface G2*f* of a chain guide G2 or a convex guide surface G1*f* of a chain guide G1, ensures a stable oil film. Thus, friction between the sliding contact portion of a plate and the flat guide surface G2*f*, or between the sliding contact portion of a plate and the convex guide surface G1*f* of the chain guide G1, can be reduced.

Since the flat surfaces 112*a* and 152*a* come into sliding contact with the flat surface G2*f* of the chain guide G2, lubricating oil retained in clearance A is reliably sealed, leakage of the lubricating oil is suppressed, smooth sliding contact with the chain guide G2 can be achieved, and engine efficiency can be improved.

Since flat surfaces 112*a* and 152*a* come into sliding contact with the a flat guide surface G2*f*, and the convex curved surfaces 112*b* and 152*b* come into sliding contact with the convex guide surface G1*f*, stress from the chain guides G1 and G2 is not concentrated at specified positions on the inner and outer plates 110 and 150, and the endurance of the plates can be significantly improved.

In each plate, the longitudinal distance between the boundaries at which the flat surfaces 112*a* or 152*a* meet the convex curved surfaces 112*b* or 152*b* is shorter than the chain pitch P. Therefore, as shown in FIG. 4, the convex curved surfaces 112*b* and 152*b* are formed without cutting out a plate portion D where a concentration of chain tensile force is most liable to be concentrated, and fatigue fracture is most liable to occur. That is, a line aligned with portion D extends through the center of a hole in a link plate and toward the interior of the chain loop in a direction perpendicular to the direction of elongation of the chain. A reduction in plate strength can be avoided, and, even if stress due to sliding contact with a flat guide surface G2f of the chain guide G2 acts on the plate portion D, sufficient chain strength can be exhibited.

Figure 6:
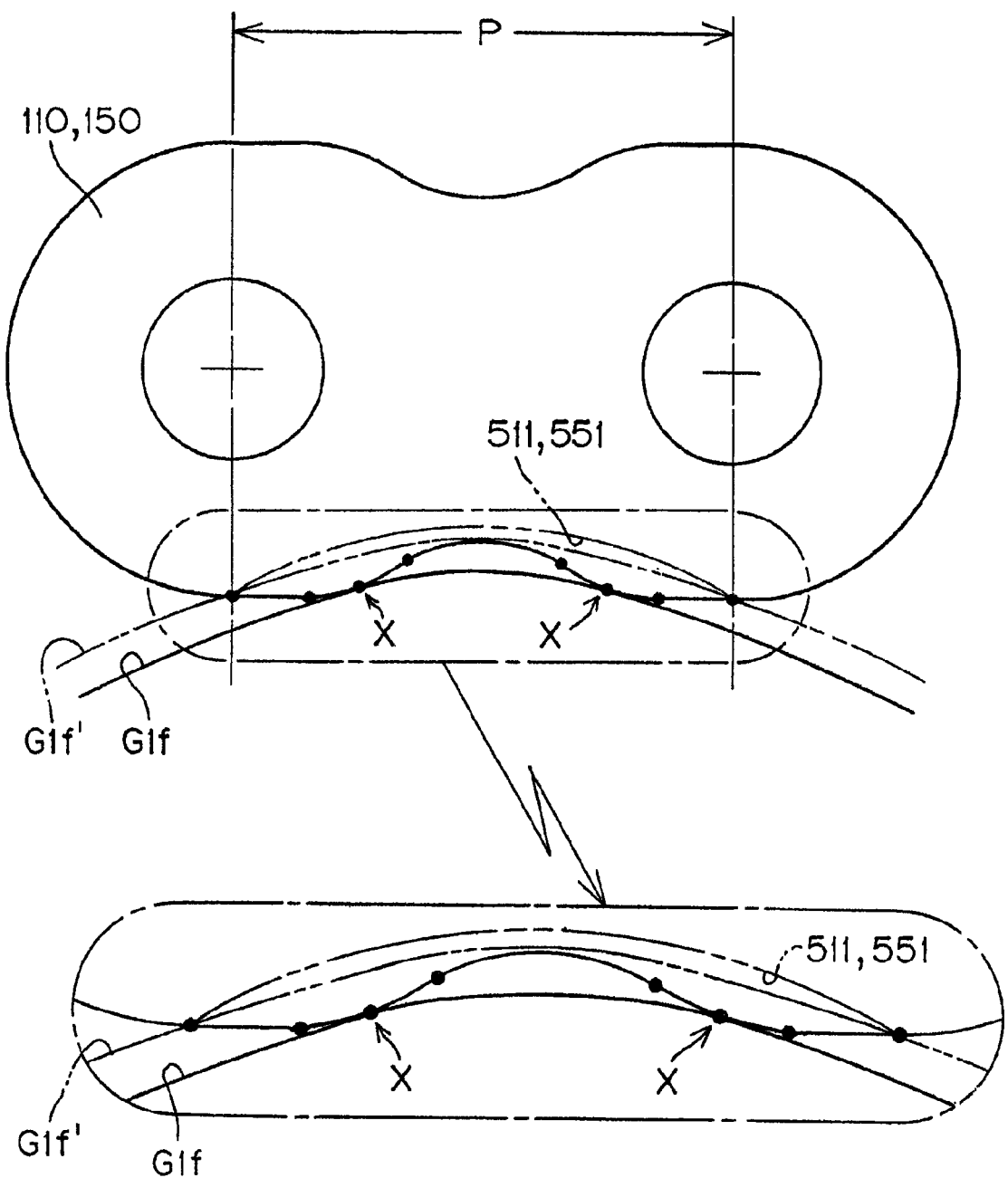
FIG. 6 is an schematic view, including an enlarged auxiliary view, illustrating how the plate configuration of the invention achieves a reduced degree of sinking when in contact with a convex chain guide surface, in comparison with that of a conventional plate.

As shown in FIG. 6, since the distance between contact positions X on a convex guide surface G1f, is shorter than the corresponding distance in a conventional transmission chain 500, in which the guide facing concave surfaces 511 and 551 have a width that is the same as or greater than the chain pitch P, sinking of the chain with respect to the convex guide surface G1f can be reduced, chain slack due to sinking is avoided, and the chain path can be stabilized. In FIG. 6, G1f' denotes a convex guide surface of a chain guide in sliding contact with a conventional transmission chain 500.

The radii of curvature of the convex curved surfaces 112b and 152b gradually increase in the direction from the flat surfaces 112a and 152a toward the concave surfaces 112c and 152c. Therefore, excessive widening of the lubricating oil retaining clearances A is avoided, and capillary action, which induces flow of lubricating oil into the lubricating oil-retaining clearance A, is enhanced. Thus, the sliding contact of the plate with chain guides G1 and G2 can be made smoother, and combustion efficiency of the engine can be improved.

Sliding contact portions 112 and 152 are each provided on the side of the chain facing outward from the loop of the chain side. However, as shown in FIGS. 3, 4 and 5, the plate portions on the inwardly facing side of the chain have a substantially identical configuration. Therefore, the plates can be symmetrical about a longitudinal plane perpendicular to the faces of the plates, and the plates can be assembled into a chain without taking their orientation into account. The symmetrical configuration also reduces the weight of the plates, and reduces the overall weight of the chain.

Figure 7:
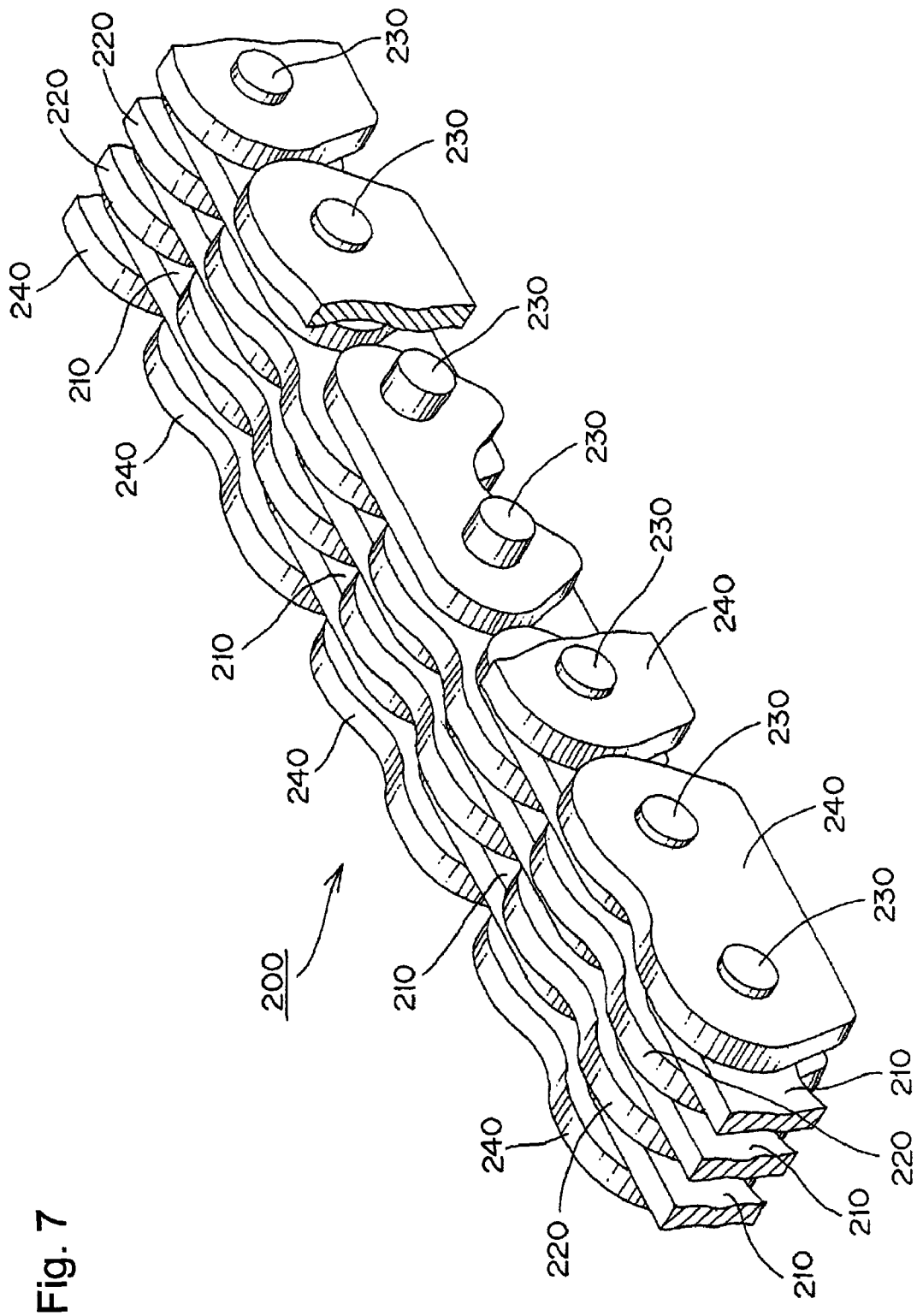
FIG. 7 is a perspective view of a part of the transmission chain according to a second embodiment of the invention.
Figure 8:
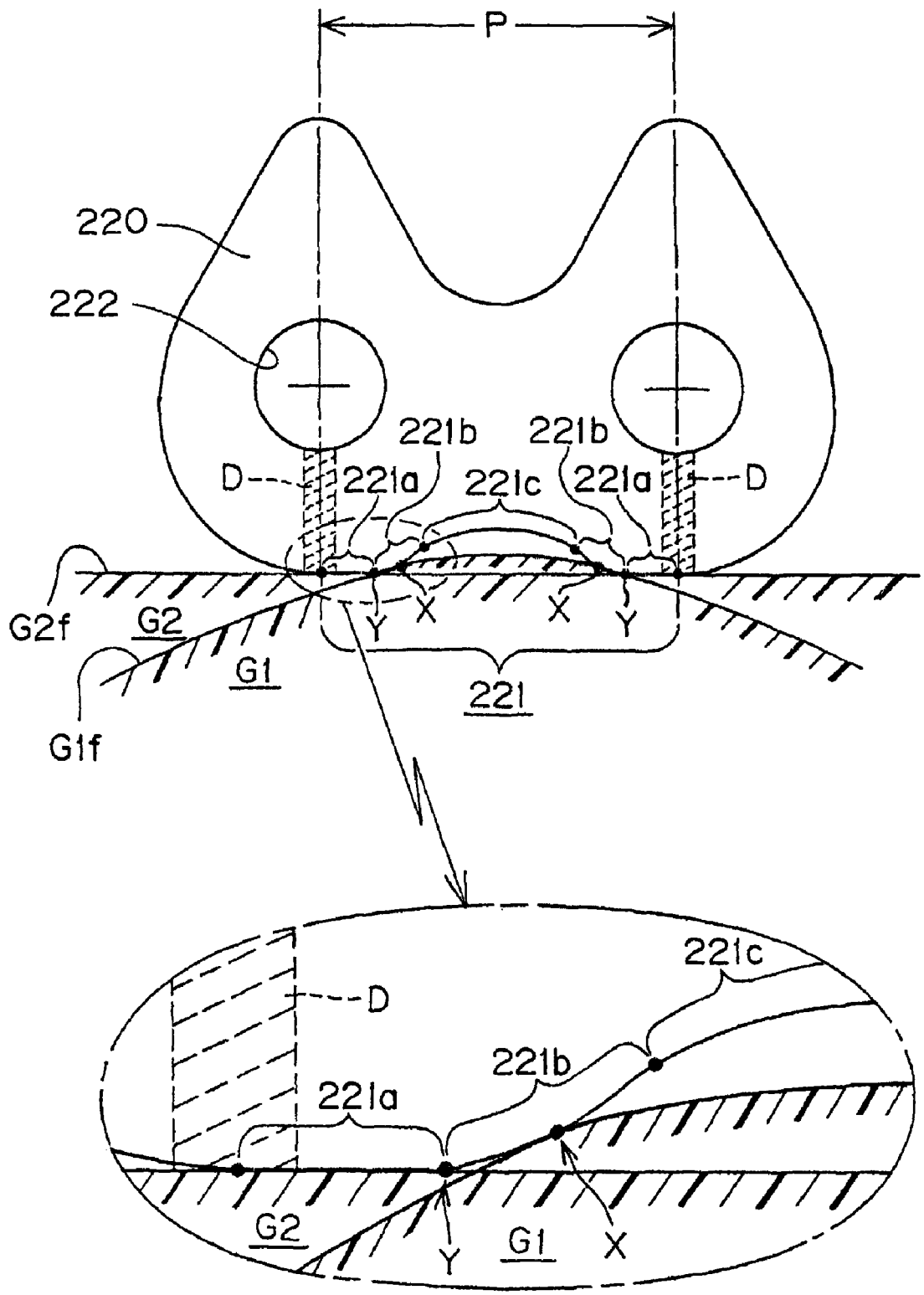
FIG. 8 is a schematic side elevational view, illustrating sliding contact between a guide row inner plate of the chain of FIG. 7 and flat and convex chain guide surfaces, including an enlarged auxiliary view.
Figure 9:
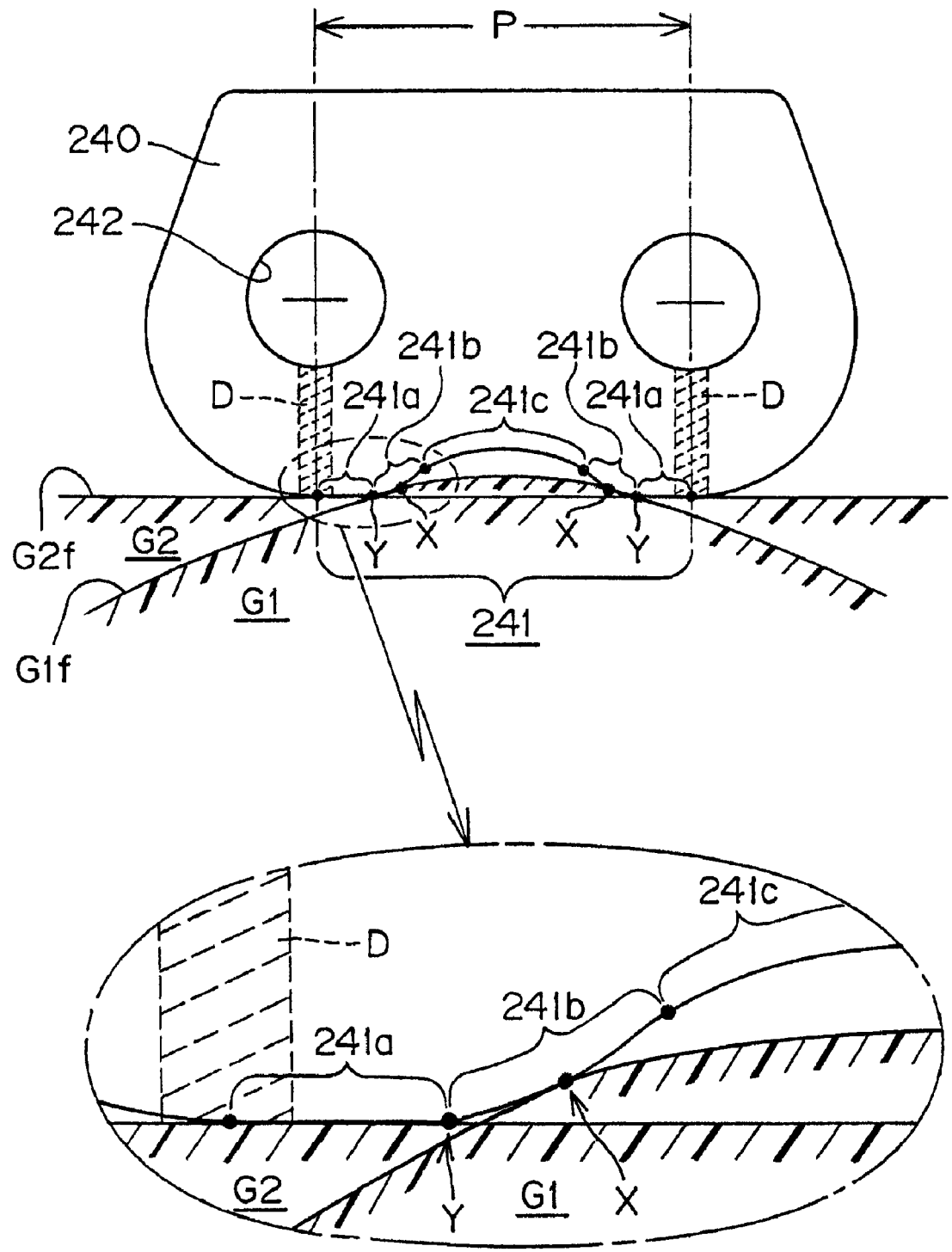
FIG. 9 is a schematic side elevational view, illustrating sliding contact between a guide plate of the chain of FIG. 7 and flat and convex chain guide surfaces, including an enlarged auxiliary view.
Figure 10:
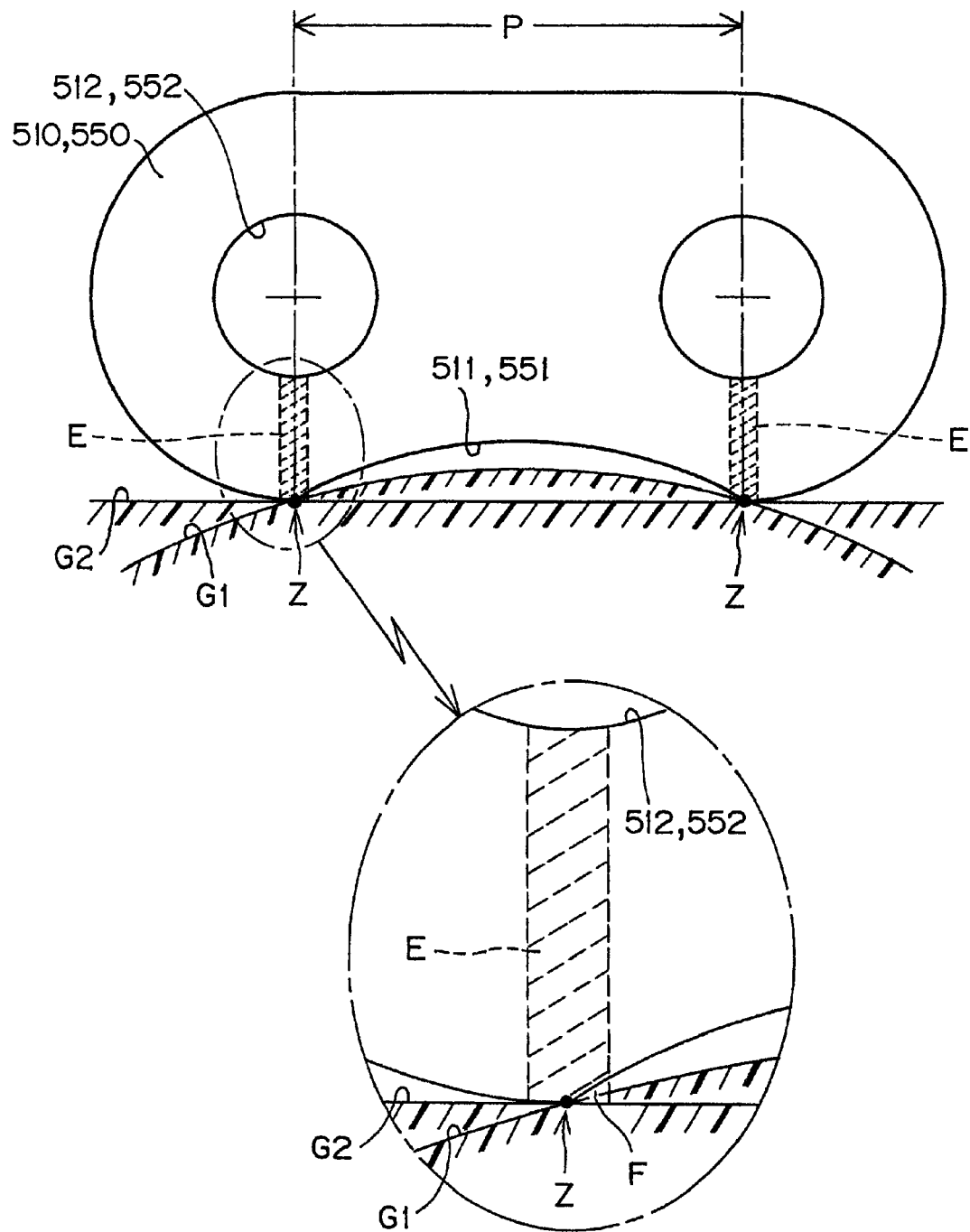
FIG. 10 is a schematic side elevational view showing contact between an inner link plate or an outer link plate of a conventional transmission chain with flat and convex chain guide surfaces.

In another embodiment of the invention, illustrated in FIGS. 7-9, a silent chain 200 used as a timing drive chain in an automobile engine, and is in mesh with a driving sprocket on an engine crankshaft and a driven sprocket on a valve-operating camshaft In the silent chain as shown in FIG. 7, engagement teeth, which engage with sprocket teeth, are formed on the side of chain that faces toward the interior of the chain loop. The chain comprises a plurality of joint row inner plates 210, a plurality of guide row inner plates 220, and guide plates 240. The plates are connected in interleaved relationship by connecting pins 230, which are press-fit into holes in the plates 240. Inside surfaces of the guide plates abut side surface of sprocket teeth. The guide are arranged at both ends of the guide row, the other plates of each guide row being inner plates 220.

The guide row inner plates 220 and the guide plates 240 are formed so that their back sides are higher than the back sides of the joint row inner plates 210. Therefore, only the guide row inner plates 220 and the guide plates 240 come into sliding contact with chain guides G1 and G2, so that the frictional resistance during chain travel is reduced.

As shown in FIGS. 8 and 9, a guide row inner plate 220, and a guide plate 240, include sliding contact portions 221 and 241 respectively, which come into sliding contact with chain guides G1 and G2 on the outwardly facing side of the chain loop.

Each of the sliding contact portions 221 and 241 comprises a pair of front and rear flat surfaces 221a and 241a respectively. The flat surfaces are formed on front and rear parts of each guide row inner plate 220 and on front and rear parts of each guide plate 240. Front and rear convex curved surfaces 221b and 241b are respectively continuous with the flat surfaces 221a and 241a and extend to intermediate lubricating oil retaining concave surfaces 221c and 241c.

As a plate comes into sliding contact with a chain guide G2 having a flat guide surface G2f, the flat surfaces of the plate are in surface contact with the flat surface of the chain guide over areas having a length corresponding to the length of each flat surface of the plate.

The convex curved surfaces 221b and 241b are continuous with the flat surfaces 221a and 241a respectively, and extend toward the centrally located concave surfaces 221c and 241c. When the plate is in sliding contact with a convex chain guide G1, the convex surface G1f of chain guide G1 comes into sliding contact with the convex curved surfaces 221b and 241b at contact locations X.

The radii of curvature of convex curved surfaces 221b and 241b gradually increase from the boundaries at which they meet the flat surfaces 221a and 241a toward the centrally located, lubricating oil-retaining, concave surfaces 221c and 241c. Because of the gradual increase in the radius of curvature, excessive widening of the lubricating oil-retaining clearance, between the chain guides G1 and G2 and the concave surfaces 221c and 241c is avoided. Therefore, capillary action, which induces flow of lubricating oil into the oil retaining clearance, is ensured.

The distance between boundaries Y, between the convex curved surfaces 221b and 241b and the flat surfaces 221a and 241a is shorter than the chain pitch P. Furthermore, the from the centers of the pin holes 222 and 242 to the contact positions X at which the convex guide surfaces G1f contact convex curved surfaces 221b and 241b is greater than the minimum distance from the center of the pin holes 221 and to the flat surfaces 221a and 241a. Thus, enhanced chain strength can be achieved even when stress acts on the convex portion of the plate near the contact position X.

The lubricating oil-retaining concave surfaces 221c and 241c respectively span the front and rear convex curved surfaces 221b and 241b, as shown in FIGS. 8 and 9. Lubricating oil is retained in a lubricating oil retaining clearance between the concave surfaces 221c and 241c and the chain guides G1 and G2.

The height of the lubricating oil-retaining clearance, that is, the maximum distance between the lubricating retaining concave curves 221c and 241c and the chain guides G1 and G2, is preferably 1 mm or less, so that sufficient capillary action, by which flow of lubricating oil into the oil-retaining clearance is induced, can be exhibited.

In the transmission chain 200, the sliding contact portions 221 and 241 of the guide row inner plates 220 and the guide plates 240, respectively, comprise a pair of front and rear flat surfaces 221a and 241a, a pair of front and rear convex curved surfaces 221b and 241b, continuous with the flat surfaces 221a and 241a and extending to oil-retaining concave surfaces 221c and 241c, which span the front and rear plate convex curved surfaces 221b and 241b.

The capillary phenomenon, which induces flow of lubricating oil into the oil-retaining clearance between this sliding contact portions 221 and 241 and a flat guide surface G2f of a chain guide G2 or a convex guide surface G1f of a chain guide G1, ensures a stable oil film. Thus, friction between the sliding contact portion of a plate and the flat guide surface G2f, or between the sliding contact portion of a plate and the convex guide surface G1f of the chain guide G1, can be reduced.

Since the flat surfaces 221a and 241a come into sliding contact with the flat surface G2f of the chain guide G2, lubricating oil retained in clearance A is reliably sealed, leakage of the lubricating oil is suppressed, smooth sliding contact with the chain guide G2 can be achieved, and engine efficiency can be improved.

Since flat surfaces 221*a* and 241*a* come into sliding contact with the a flat guide surface G2*f*, and the convex curved surfaces 221*b* and 241*b* come into sliding contact with the convex guide surface G1*f*, stress from the chain guides G1 and G2 is not concentrated at specified positions on the guide row inner plates 220 and the guide plates 240, and the endurance of the plates can be significantly improved.

In each plate, the longitudinal distance between the boundaries at which the flat surfaces 221*a* or 241*a* meet the convex curved surfaces 221*b* or 241*b* is shorter than the chain pitch P. Therefore, as shown in FIGS. 8 and 9, the convex curved surfaces 221*b* and 241*b* are formed without cutting out a plate portion D where a concentration of chain tensile force is most liable to be concentrated, and fatigue fracture is most liable to occur. That is, a line aligned with portion D extends through the center of a hole in a link plate and toward the interior of the chain loop in a direction perpendicular to the direction of elongation of the chain. A reduction in plate strength can be avoided, and, even if stress due to sliding contact with a flat guide surface G2*f* of the chain guide G2 acts on the plate portion D, sufficient chain strength can be exhibited.

Since the distance between contact positions X on a convex guide surface G1*f*, is shorter than the corresponding distance in a conventional transmission chain 500, in which the guide facing concave surfaces 511 and 551 have a width that is the same as or greater than the chain pitch P, sinking of the chain with respect to the convex guide surface G1*f* can be reduced, chain slack due to sinking is avoided, and the chain path can be stabilized.

The radii of curvature of the convex curved surfaces 221*b* and 241*b* gradually increase in the direction from the flat surfaces 221*a* and 241*a* toward the concave surfaces 221*c* and 241*c*. Therefore, excessive widening of the lubricating oil retaining clearances is avoided, and capillary action, which induces flow of lubricating oil into the lubricating oil-retaining clearance, is enhanced. Thus, the sliding contact of the plate with chain guides G1 and G2 can be made smoother, and combustion efficiency of the engine can be improved.

What is claimed is:

1. A traveling transmission chain for use in an engine, comprising first and second sets of plates interconnected in overlapping relationship and forming an elongated, endless loop disposed in a path of travel lying substantially in a plane, the loop surrounding an inside region of said plane and being surrounded by an outside region in said plane; wherein each plate has a pair of holes for receiving a connecting pin;

the chain has a chain pitch equal to the distance from the center of one of the holes in each plate to the center of the other hole in the same plate;

each plate of both sets has a guide-engaging portion for sliding contact with a chain guide;

the guide-engaging portion of each plate of at least one of the first and second sets comprises a pair of front and rear flat surfaces, spaced from each other in the direction of elongation of the chain, for sliding contact with a flat guide surface of a chain guide;

the guide-engaging portion of each plate of said at least one of the first and second sets also comprises a pair of front and rear convex curved surfaces for sliding contact with a convex guide surface a chain guide;

each said convex curved surface of each plate being continuous with one of said flat surfaces of the same plate and meeting said one of said flat surfaces at a boundary, and said convex curved surfaces of each said plate being disposed between the flat surfaces of the same plate in the direction of elongation of the chain;

each plate of said at least one of the first and second sets has a concave surface, extending from one of the convex curved surfaces of the same plate to the other convex curved surface of the same plate, for forming a lubricating oil-retaining clearance between the plate and a flat guide surface and for also forming a lubricating oil-retaining clearance between the plate and a convex guide surface;

the distance between the boundaries between the flat and convex surfaces of each plate of said at least one of the first and second sets is shorter than the chain pitch; and the radius of curvature of each said convex curved surface gradually increases in the direction from the boundary at which it meets a flat surface toward the concave surface of the same plate.

2. A traveling transmission chain according to claim 1, in which each plate of said at least one of the first and second sets has substantially identical edge configurations respectively facing said inside region and said outside region.

\* \* \* \* \*